United States Patent
Glickman et al.

(10) Patent No.: US 10,123,603 B1
(45) Date of Patent: Nov. 13, 2018

(54) DIFFUSE FIBER OPTIC LIGHTING FOR LUGGAGE

(71) Applicant: Multek Technologies Limited, San Jose, CA (US)

(72) Inventors: Michael James Glickman, Mountain View, CA (US); Mark Bergman, Redwood City, CA (US); Joan Vrtis, Mesa, AZ (US)

(73) Assignee: Multek Technologies Limited, San Jose, CA (US)

( * ) Notice: Subject to any disclaimer, the term of this patent is extended or adjusted under 35 U.S.C. 154(b) by 0 days.

(21) Appl. No.: 15/080,430

(22) Filed: Mar. 24, 2016

Related U.S. Application Data

(60) Provisional application No. 62/139,436, filed on Mar. 27, 2015.

(51) Int. Cl.
| | |
|---|---|
| *A45C 15/06* | (2006.01) |
| *F21V 8/00* | (2006.01) |
| *F21V 23/04* | (2006.01) |
| *F21V 23/02* | (2006.01) |
| *F21V 17/10* | (2006.01) |
| *F21V 33/00* | (2006.01) |
| *F21Y 101/02* | (2006.01) |

(52) U.S. Cl.
CPC ............ *A45C 15/06* (2013.01); *F21V 17/101* (2013.01); *F21V 23/02* (2013.01); *F21V 23/0435* (2013.01); *F21V 33/0004* (2013.01); *G02B 6/0006* (2013.01); *F21Y 2101/02* (2013.01); *F21Y 2101/025* (2013.01)

(58) Field of Classification Search
CPC ... A45C 15/06; F21V 17/101; F21V 23/0435; F21V 33/0004; F21V 23/045; G02B 6/0006; F21Y 2115/00; F21Y 2115/10; F21Y 2115/15; F21Y 2115/20
USPC ................................................. 362/558, 156
See application file for complete search history.

(56) References Cited

U.S. PATENT DOCUMENTS

| | | |
|---|---|---|
| 4,069,497 A | 1/1978 | Steidlitz |
| 4,712,160 A | 12/1987 | Sato et al. |
| (Continued) | | |

FOREIGN PATENT DOCUMENTS

| | | | | |
|---|---|---|---|---|
| DE | 102004053481 A1 * | 5/2006 | ............. | A45C 13/18 |

OTHER PUBLICATIONS

Non-final office action dated May 17, 2018, U.S. Appl. No. 15/172,067, filed Jun. 2, 2016, applicant: Chris Stratas, 14 pages.

*Primary Examiner* — Paultep Savusdiphol
(74) *Attorney, Agent, or Firm* — Haverstock & Owens LLP

(57) ABSTRACT

The luggage lighting system includes a piece of luggage and a lighting module coupled to the luggage. In some embodiments, the lighting module is a fiber-optic lighting module. The luggage includes an outer surface, and the lighting module includes a light diffuser coupled to the outer surface. In some embodiments, the light diffuser is a fiber-optic light diffuser. The lighting module also includes a light source, such as a laser or a light emitting diode (LED). When the light source is powered on, the output light is directed through the light diffuser. The light diffuser is configured to output single or multiple colors of light, easily observed by someone looking at the luggage. The luggage lighting system is particularly useful for identifying one's luggage from surrounding pieces of luggage lacking the luggage lighting system.

21 Claims, 2 Drawing Sheets

(56) References Cited

U.S. PATENT DOCUMENTS

| | | | |
|---|---|---|---|
| 4,899,256 A | 2/1990 | Sway-Tin | |
| 4,985,817 A | 1/1991 | Yale | |
| 5,101,322 A | 3/1992 | Ghaem et al. | |
| 5,235,491 A | 8/1993 | Weiss | |
| 5,272,599 A | 12/1993 | Koenan | |
| 5,295,044 A | 3/1994 | Araki et al. | |
| 5,365,403 A | 11/1994 | Vinciarelli et al. | |
| 5,838,554 A | 11/1998 | Lanni | |
| 5,920,458 A | 7/1999 | Azar | |
| 5,933,324 A | 8/1999 | Barrett | |
| RE36,414 E | 11/1999 | Tickner | |
| 6,243,269 B1 | 6/2001 | Dibene, II et al. | |
| 6,272,015 B1 | 8/2001 | Mangtani | |
| 6,282,092 B1 | 8/2001 | Okamoto et al. | |
| 6,369,328 B1 | 4/2002 | Munakata | |
| 6,522,253 B1* | 2/2003 | Saltus | G08B 21/24 340/539.1 |
| 6,549,409 B1 | 4/2003 | Saxelby et al. | |
| 6,775,162 B2 | 8/2004 | Mihai et al. | |
| 6,795,315 B1 | 9/2004 | Wu et al. | |
| 6,882,111 B2 | 4/2005 | Kan et al. | |
| 7,055,978 B2* | 6/2006 | Worthington | A45F 3/04 362/103 |
| 7,208,833 B2 | 4/2007 | Nobori et al. | |
| 7,259,403 B2 | 8/2007 | Shimizu et al. | |
| 7,338,186 B1 | 3/2008 | Wu et al. | |
| 7,641,370 B2 | 1/2010 | Heine et al. | |
| 8,055,023 B2 | 11/2011 | Goto et al. | |
| 8,227,269 B2 | 7/2012 | Chen et al. | |
| 9,279,553 B1 | 3/2016 | Scribante | |
| 9,557,022 B2 | 1/2017 | Araki | |
| 2001/0042865 A1 | 11/2001 | Oshio et al. | |
| 2001/0045297 A1 | 11/2001 | Miller et al. | |
| 2002/0008963 A1 | 1/2002 | DiBene, II et al. | |
| 2002/0092160 A1 | 7/2002 | McCullough | |
| 2003/0132842 A1* | 7/2003 | Chia-Yen | G08B 21/24 340/568.1 |
| 2004/0075554 A1* | 4/2004 | Yang | G08B 21/24 340/539.32 |
| 2004/0122606 A1 | 6/2004 | Cohen et al. | |
| 2004/0144527 A1 | 7/2004 | Yang et al. | |
| 2005/0001113 A1 | 1/2005 | Sullivan | |
| 2005/0013128 A1* | 1/2005 | Worthington | A45C 15/06 362/84 |
| 2006/0145830 A1* | 7/2006 | Comstock | A45C 13/42 340/505 |
| 2006/0186423 A1 | 8/2006 | Blonder | |
| 2006/0186430 A1 | 8/2006 | Park et al. | |
| 2006/0196642 A1 | 9/2006 | Gharib | |
| 2006/0261970 A1 | 11/2006 | Colacecchi | |
| 2007/0153503 A1* | 7/2007 | Feng | A45C 15/06 362/156 |
| 2008/0048200 A1 | 2/2008 | Mueller et al. | |
| 2008/0088445 A1* | 4/2008 | Oas | A45C 13/24 340/571 |
| 2008/0205075 A1 | 8/2008 | Hikment et al. | |
| 2009/0179207 A1 | 7/2009 | Chitnis et al. | |
| 2009/0307945 A1* | 12/2009 | Bopp | G09F 3/12 40/6 |
| 2010/0259408 A1* | 10/2010 | Berger | A45C 13/28 340/815.4 |
| 2010/0277944 A1* | 11/2010 | Hurwitz | A41D 27/08 362/570 |
| 2010/0295070 A1 | 11/2010 | Su et al. | |
| 2010/0295077 A1 | 11/2010 | Melman | |
| 2011/0187292 A1* | 8/2011 | Sheikh | A45C 15/06 315/313 |
| 2011/0204780 A1 | 8/2011 | Shum | |
| 2011/0228517 A1 | 9/2011 | Kawabalt et al. | |
| 2012/0007506 A1 | 1/2012 | Ohmi | |
| 2012/0019137 A1 | 1/2012 | Sakarikas et al. | |
| 2012/0052879 A1* | 3/2012 | Wildon | A45C 13/18 455/456.1 |
| 2012/0097985 A1 | 4/2012 | Liu et al. | |
| 2012/0205697 A1 | 8/2012 | Kim et al. | |
| 2012/0218746 A1 | 8/2012 | Winton | |
| 2013/0050998 A1 | 2/2013 | Chu et al. | |
| 2013/0088888 A1* | 4/2013 | Fewkes | G02B 6/001 362/558 |
| 2013/0182425 A1 | 7/2013 | Seki et al. | |
| 2014/0265930 A1 | 9/2014 | Harris | |
| 2015/0223021 A1* | 8/2015 | Wildon | A45C 13/18 340/539.32 |
| 2015/0335135 A1* | 11/2015 | Stoll | F21L 4/08 362/108 |

* cited by examiner

DIFFUSE FIBER OPTIC LIGHTING FOR LUGGAGE

RELATED APPLICATIONS

This Patent Application claims priority under 35 U.S.C. 119(e) of the U.S. provisional patent application, Application No. 62/139,436, filed on Mar. 27, 2015, and entitled "DIFFUSE FIBER OPTIC LIGHTING FOR LUGGAGE," which is hereby incorporated by reference in its entirety.

FIELD OF THE INVENTION

The present invention is generally directed to luggage. More specifically, the present invention is directed to diffuse fiber optic lighting for luggage.

BACKGROUND OF THE INVENTION

Luggage is a common item used by travelers. When traveling through a transportation hub, such as an airport or train station, it is important to be able to identify one's own luggage from the luggage of other travelers. The task of identifying one's luggage is particularly challenging at areas where travelers congregate, such as at an airport baggage carousel.

SUMMARY OF THE INVENTION

Embodiments of the luggage lighting system include a piece of luggage and a lighting module coupled to the luggage. In some embodiments, the lighting module is a fiber-optic lighting module. The luggage includes an outer surface, and the lighting module includes a light diffuser coupled to the outer surface. In some embodiments, the light diffuser is a fiber-optic light diffuser. The lighting module also includes a light source, such as a laser or a light emitting diode (LED). When the light source is powered on, the output light is directed through the light diffuser. The light diffuser is configured to output single or multiple colors of light, easily observed by someone looking at the luggage. The luggage lighting system is particularly useful for identifying one's luggage from surrounding pieces of luggage lacking the luggage lighting system.

In an aspect, a luggage lighting system is disclosed. The luggage lighting system includes a piece of luggage having an outer surface; and a lighting module coupled to the piece of luggage. The lighting module includes a light source and a light diffuser, wherein the light diffuser is coupled to the outer surface of the luggage. In some embodiments, the light diffuser comprises an optical fiber. In some embodiments, the optical fiber comprises a light diffusing optical fiber. In some embodiments, the light diffusing optical fiber comprises one of a light diffusing glass fiber, a phosphor doped fiber, or a plastic diffusing fiber. In some embodiments, the light diffuser further comprises a light transparent sleeve into which the light diffusing optical fiber is positioned. In some embodiments, the light transparent sleeve comprises a light transparent plastic tube. In some embodiments, the light diffuser further comprises a light translucent sleeve into which the light diffusing optical fiber is positioned. In some embodiments, the light translucent sleeve comprises a light translucent plastic tube. In some embodiments, the outer surface of the luggage includes one more seams, and the light diffuser is coupled to the outer surface at or adjacent to at least one of the one or more seams. In some embodiments, the light source comprises one or more lasers coupled to the light diffuser. In some embodiments, the light source comprises one or more light emitting diodes coupled to the light diffuser. In some embodiments, the light diffuser is sewn to the outer surface of the luggage. In some embodiments, the luggage lighting system further includes an adhesive for coupling the light diffuser to the outer surface of the luggage. In some embodiments, the light diffuser is configured to output a single color of light. In some embodiments, the light diffuser can be configured to output a series of different colored lights. In some embodiments, the lighting module further includes a power source to supply power to the light source and a control circuit to control the power supply and the light source. In some embodiments, the power source comprises a battery, an energy harvesting element, or a combination of both a battery and an energy harvesting element. In some embodiments, the light module further includes an ON/OFF switch coupled to the control circuit to manually turn ON/OFF the light source. In some embodiments, the light module further includes a wireless receiver coupled to the control circuitry to wirelessly receive a signal to turn ON/OFF the light source.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Figure 1:
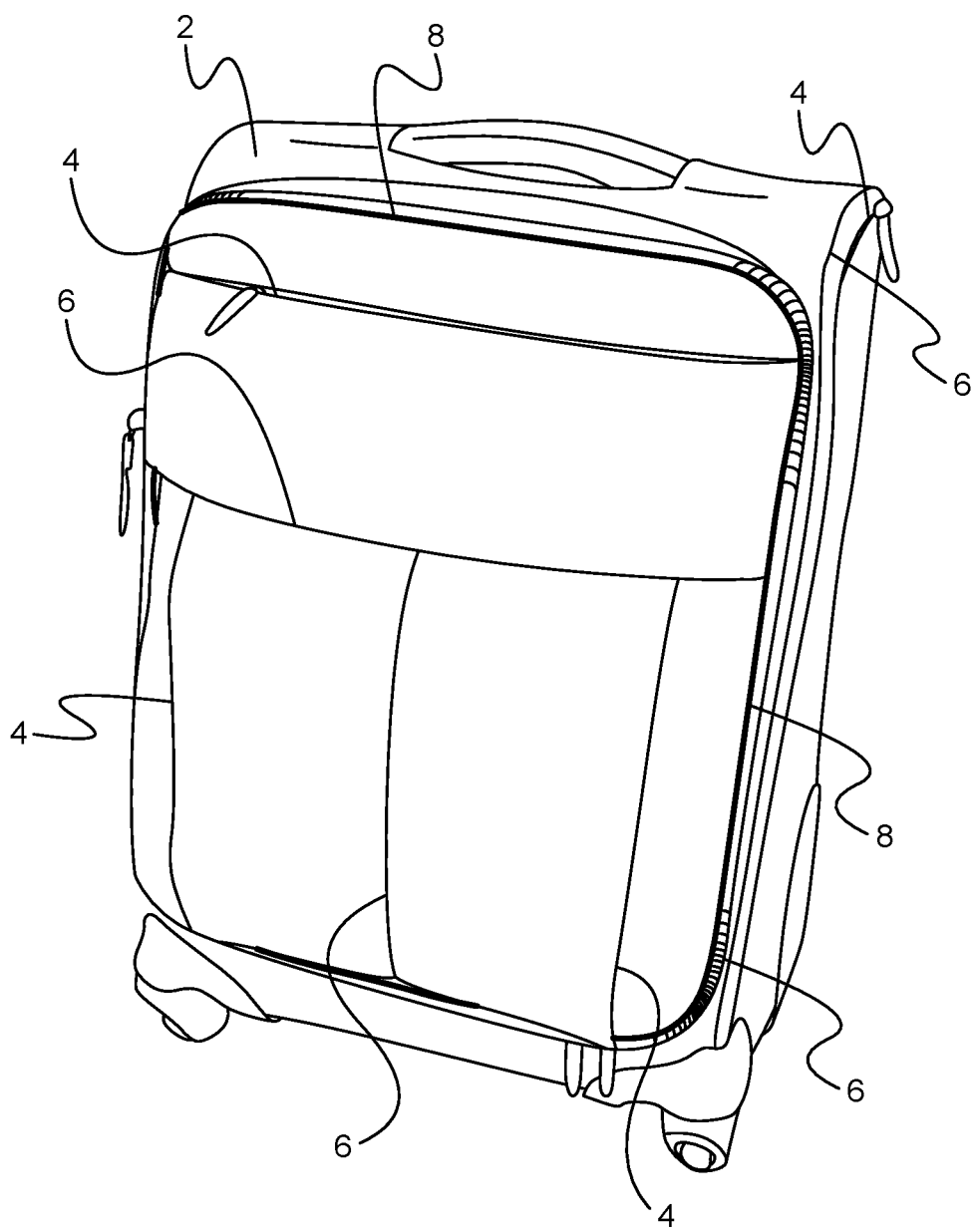
FIG. 1 illustrates a perspective view of the luggage lighting system according to some embodiments.

Embodiments of the present application are directed to a luggage lighting system. Those of ordinary skill in the art will realize that the following detailed description of the luggage lighting system is illustrative only and is not intended to be in any way limiting. Other embodiments of the luggage lighting system will readily suggest themselves to such skilled persons having the benefit of this disclosure.

Reference will now be made in detail to implementations of the luggage lighting system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

A lighting module is coupled to a piece of luggage so as to output an externally visible lighting pattern. In general, the lighting module includes a light source and a light diffuser for propagating and or spreading light over a specified area, such as in a specified lighting pattern. At least the light diffuser is coupled to an outer surface of a piece of luggage such that light output form the light diffuser is externally visible. In some embodiments, the light diffuser includes an optical fiber inserted into a light diffusing element, such as a translucent plastic tube or other sleeve-like element. The light diffusing element functions to diffuse light output from the optical fiber as well as protect the optical fiber from excessive bending and abrasion. In some embodiments, the optical fiber is a light diffuser such as a light diffusing glass fiber, a phosphor doped fiber, or a plastic diffusing fiber. In some embodiments, the light diffusing optical fiber is the Corning company's Fibrance® product or other defusing fiber material either glass or plastic with variable refractive indexes to control the light emission. The light diffusing optical fiber can be inserted into a translucent or transparent protective sleeve.

The light diffuser can be attached or embedded into the luggage in multiple ways. For example, outlining the light diffusing optical fiber along one or more seams of the luggage. A seam often appears as a ridge or an indent in the luggage outer surface and can function to protect the light diffuser from excessive wear, as well as hide or camouflage the light diffuser when the lighting module is not powered on. In other embodiments, the light diffuser is attached to the luggage outer surface in a desired pattern, not necessarily coincident with the luggage seams. In some embodiments, the light diffuser is sewn to the luggage outer surface. In other embodiments, an adhesive is used to secure the light diffuser to the luggage outer surface. It is understood that a combination of sewing and adhesive, or other securing techniques can be used to secure the light diffuser to the luggage outer surface. As another example, the light diffusing optical fiber can be embedded in the handle or other area on the luggage that is translucent to allow the light to emit as well as have a mechanical encasement around the light diffusing optical fiber for reliability protection. It is understood that the light diffuser can alternatively be attached or embedded into the luggage such that the emitted light is externally visible.

The light diffuser can also be configured such that the light output from the light diffuser is colored or multi-colored. For example, the light diffuser can be configured to output a single color along its entire length. As another example, the light diffuser can be configured to output a series of different colors, or alternating series of colors along its length, such as a blue section, followed by a red section, followed by green section, and so on, thereby forming a color sequence or pattern.

In some embodiments, the light source is also coupled to the luggage outer surface. In other embodiments, the light source is positioned within an inner compartment or outer pocket of the luggage. In this alternative configuration, the light diffuser is coupled to the light source via an opening in the luggage outer surface.

The lighting module can be controlled using an ON/OO switch and/or a remote control source such as an application on a phone or other remote smart connecting source. The lighting module can have a transceiver for connecting to the remote control source using, for example, Wi-fi or Bluetooth® type protocol. The lighting module can also include a proximity indicator that indicates that the luggage is in proximity of the remote control source of the traveler or owner of the luggage. The lighting module is powered by a battery, energy harvesting element, or some combination thereof.

FIG. 1 illustrates a perspective view of the luggage lighting system according to some embodiments. The luggage lighting system includes a piece of luggage 2 having one or more zippers 4 and one or more seams 6. The zippers 4 are used to access internal compartments or access exterior pockets. The seams 6 are formed where the exterior pockets are attached and where various outer surface segments are joined together, such as by stitching, to form a sealed outer surface. Seams are also formed where the zippers are attached.

A light diffuser 8 is coupled to the outer surface of the luggage 4. In the exemplary embodiments shown in FIG. 1, the light diffuser 8 is attached adjacent to a ridge-like seam 6. In this example, the light diffuser 8 extends around the front facing outer surface. The light diffuser 8 outputs externally visible light when the lighting module is turned ON.

Figure 2:
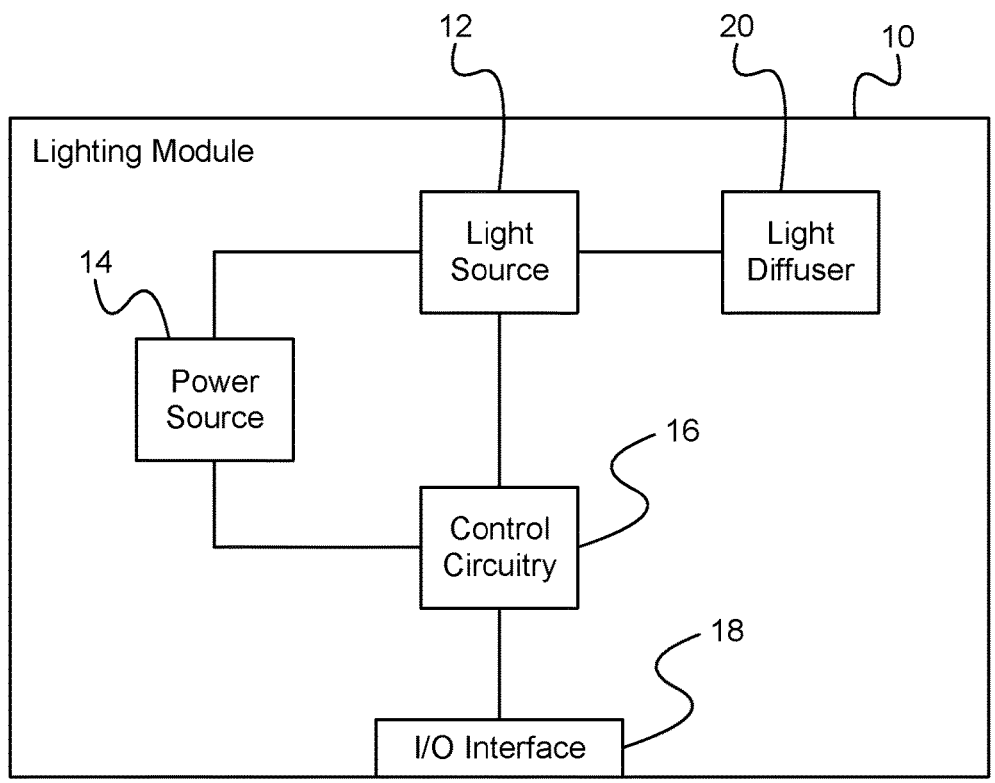
FIG. 2 illustrates a functional block diagram of the lighting module according to some embodiments.

FIG. 2 illustrates a functional block diagram of the lighting module according to some embodiments. The lighting module 10 includes the light diffuser 20, a light source 12, a power source 14, control circuitry 16 and an input/output (I/O) interface 18. The light diffuser 20 and the power source 14 can be of any of the type described above. The light source 12 includes one or more lasers or light emitting diodes (LEDs) coupled to the light diffuser 20. The control circuitry 16 controls the light source 12 and the power source 14. The I/O interface 18 is coupled to the control circuitry 16 and is configured to receive and provide to the control circuitry 16 an ON/OFF signal. In some embodiments, the I/O interface 18 includes a manually operated switch. In other embodiments, the I/O interface 18 includes a wireless transreceiver to wirelessly receive a signal to turn ON/OFF the light source.

The present application has been described in terms of specific embodiments incorporating details to facilitate the understanding of the principles of construction and operation of the luggage lighting system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A luggage lighting system comprising:
   a. piece of luggage having an outer surface, wherein the outer surface includes one or more seams; and
   b. a lighting module coupled to the piece of luggage, wherein the lighting module comprises a light source and a light diffuser, further wherein the light diffuser is coupled to the outer surface at or adjacent to, and in physical contact with, at least one of the one or more seams of the luggage, wherein the lighting module further comprises a proximity indicator that indicates that the luggage is in proximity of a remote control source.

2. The luggage lighting system of claim 1 wherein the light diffuser comprises an optical fiber.

3. The luggage lighting system of claim 2 wherein the optical fiber comprises a light diffusing optical fiber.

4. The luggage lighting system of claim 3 wherein the light diffusing optical fiber comprises one of a light diffusing glass fiber, a phosphor doped fiber, or a plastic diffusing fiber.

5. The luggage lighting system of claim 3 wherein the light diffuser further comprises a light transparent sleeve into which the light diffusing optical fiber is positioned.

6. The luggage lighting system of claim 5 wherein the light transparent sleeve comprises a light transparent plastic tube.

7. The luggage lighting system of claim 5 wherein the light transparent sleeve is sewn to the outer surface of the luggage.

8. The luggage lighting system of claim 3 wherein the light diffuser further comprises a light translucent sleeve into which the light diffusing optical fiber is positioned.

9. The luggage lighting system of claim 8 wherein the light translucent sleeve comprises a light translucent plastic tube.

10. The luggage lighting system of claim 8 wherein the light translucent sleeve is sewn to the outer surface of the luggage.

11. The luggage lighting system of claim 2 wherein the light diffuser further comprises a light translucent sleeve into which the optical fiber is positioned.

12. The luggage lighting system of claim 1 wherein the light source comprises one or more lasers coupled to the light diffuser.

13. The luggage lighting system of claim 1 wherein the light source comprises one or more light emitting diodes coupled to the light diffuser.

14. The luggage lighting system of claim 1 wherein the light diffuser is sewn to the outer surface of the luggage.

15. The luggage lighting system of claim 1 wherein further comprising an adhesive for coupling the light diffuser to the outer surface of the luggage.

16. The luggage lighting system of claim 1 wherein the light diffuser is configured to output a single color of light.

17. The luggage lighting system of claim 1 wherein the light diffuser is configured to output a series of different colored lights.

18. The luggage lighting system of claim 1 wherein the lighting module further comprises a power source to supply power to the light source and a control circuit to control the power supply and the light source.

19. The luggage lighting system of claim 18 wherein the power source comprises a battery, an energy harvesting element, or a combination of both a battery and an energy harvesting element.

20. The luggage lighting system of claim 1 wherein the light module further comprises an ON/OFF switch coupled to the control circuit to manually turn ON/OFF the light source.

21. The luggage lighting system of claim 1 wherein the lighting module further comprises a wireless receiver coupled to the control circuitry to wirelessly receive a signal to turn ON/OFF the light source.

* * * * *